United States Patent Office 3,639,460
Patented Feb. 1, 1972

---

3,639,460
ESTERIFICATION OF METHACRYLIC ACID
Franz Wenzel, Darmstadt, and Karl Heinz Riemann, Darmstadt-Eberstadt, Germany, assignors to Rohm Gesellschaft mit beschrankter Haftung, Darmstadt, Germany
No Drawing. Filed July 3, 1968, Ser. No. 742,149
Claims priority, application Germany, July 11, 1967, R 46,448
Int. Cl. C07c 69/54
U.S. Cl. 260—486 R
1 Claim

ABSTRACT OF THE DISCLOSURE

Improved method for continuously esterifying methacrylic acid by introducing equivalent amounts of the acid and esterifying alcohol into a sump phase in a column at, at most, a rate equal to the rate of formation of ester, and removing the ester in azeotropic admixture with water. The sump phase initially comprises methacrylic acid and a sulfuric and/or sulfonic acid catalyst.

---

The present invention relates to an improved method for esterifying methacrylic acid.

The esterification of methacrylic acid with an alcohol in the presence of an esterification catalyst is known in the art. Sulfuric acid or sulfonic acids such as p-toluene sulfonic acid have principally been used as catalysts for the esterification. As to the amount in which these acid catalysts are employed, German patent publications 1,006,848 and 1,161,259 teach that 0.01 mol of concentrated sulfuric acid per mol of methacrylic acid, or 0.02 percent by weight of sulfuric acid calculated on the esterification mixture of methacrylic acid and alcohol, are to be used. The amounts in which methanesulfonic acid or a mixture of methane-, ethane-, and propanesulfonic acids are used are of the same order of magnitude according to U.S. Patent 2,917,538.

It has now been found that methacrylic acid can be continuously esterified with lower ($C_1$-$C_4$) aliphatic alcohols with the production of high yields by the use of concentrated sulfuric acid or a sulfonic acid of the formula $RSO_3H$, wherein R is $C_6H_5$—, —$C_6H_4CH_3$, —$C_6H_4SO_3R'$, and R' is —H, —$CH_3$, —$C_2H_5$, or —$C_3H_8$, or a mixture of these acids. In the process of the invention, methacrylic acid and alcohol, preferably a monohydric alkanol, are introduced in approximately an equimolar ratio into a sump phase of methacrylic acid and sulfuric and/or sulfonic acids in the base of a fractionating column with at most the same velocity with which the desired ester is formed. At the start of the reaction, the sump is composed of (a) a methacrylic acid portion which is 50 to 200 percent by weight of the amount of methacrylic acid to be introduced into the sump per hour, and (b) a quantity of $SO_3$ (introduced in the form of sulfuric acid or sulfonic acids) which is from 8 to 30 percent by weight of the methacrylic acid present in the sump.

The process of the present invention initially makes one expect the formation of considerable quantities of ether; Because of the technical preparation of ether by catalytic cleavage of water from two molecules of alcohol on heating to 100°–140° C., with 60–90 percent sulfuric acid, the process of the present invention would seem to involve the production of large quantities of ether. Further, it would be expected that an operation involving a continuous excess of methacrylic acid in the sump would give rise to considerable losses of the acid (or its esters) by polymerization of these unsaturated compounds.

The examples following herein show that these expectations of one skilled in the art are prejudices which it is the object of the present invention to overcome.

In the preparation of the aforementioned methacrylic acid esters, an azeotropic mixture comprising ester and water is removed, sometimes with a small amount of alcohol in addition. In order to hinder distillation of the methacrylic acid, a portion of the ester formed, which is carried over together with water in the azeotropic mixture and which is drawn off after separation of the distillate into layers, is returned to the column as reflux. All of the esters prepared according to the present invention have a density of less than 1 and therefore form the upper layer on separation of the distilled azeotrope into layers.

A better understanding of the present invention and of its many advantages will be had by referring to the following specific examples given by way of illustration.

EXAMPLE 1

Preparation of methyl methacrylate

A sump phase comprising 400 grams of methacrylic acid and, respectively, (a) 40 grams of $H_2SO_4$, i.e. 10 percent;
(b) 80 grams of $H_2SO_4$, i.e. 20 percent; and
(c) 120 grams of $H_2SO_4$, i.e. 30 percent were introduced into an esterification reactor. At a bath temperature of 165° C. and a reaction temperature, respectively, of (a) 117° C.;
(b) 118° C.;
(c) 117° C.;

and at a pressure of 250 mm. Hg (a) 215 ml. of methanol and 395 ml. of methacrylic acid;
(b) 200 ml. of methanol and 363 ml. of methacrylic acid; and
(c) 205 ml. of methanol and 440 ml. of methacrylic acid were, respectively, introduced per hour over a period of 24 hours. The mol ratio of methacrylic acid to methanol was, respectively, (a) 0.85;
(b) 0.85; and
(c) 0.99.

At a head temperature of (a) 57° C.;
(b) 58° C.; and
(c) 59° C., an ester-water azeotrope (86 percent by weight of ester and 14 percent by weight of water) and methanol were withdrawn. After separation, the upper layer was analyzed. Gas chromatography showed that the upper layer respectively comprised:

(a) 95.6 percent of methyl methacrylate, 2.6 percent methanol and 1.8 percent water;
(b) 97.6 percent methyl methacrylate,, 0.8 percent methanol and 1.4 percent water;
(c) 97.7 percent methyl methacrylate, 0.6 percent methanol and 1.4 percent water.

Dimethyl ether was present in only trace quantities, and impurities not specifically identified comprised 0.1–0.3 percent by weight of the crude product.

The conversion of methanol was, respectively, (a) 85 percent of theory;
(b) 97 percent of theory;
(c) 98 percent of theory.

The methacrylic acid introduced in (a)–(c) was practically 100 percent esterified.

The values given above represent average values from a 24-hour run of the esterification apparatus.

EXAMPLE 2

Preparation of ethyl methacrylate

A sump phase comprising 400 grams of methacrylic acid and 100 grams of $H_2SO_4$ were introduced into an esterification reactor. At a reactor temperature of about 118° C. and a pressure of 250 mm. Hg, and with simultaneous bubbling of air into the mixture, 320 ml. of ethanol and 420 ml. of methacrylic acid were introduced per hour for a period of 20 hours. The mol ratio $C_2H_5OH$:methacrylic acid was 1.0:0.9. The esterification distillate was drawn off at a head temperature of 74° C./250 mm. Hg. The ethyl methacrylate/water azeotrope distilling off with ethanol comprised 79 percent by weight of ester and 21 percent by weight of water.

After 20 hours the run was terminated. After separation of the collected distillate into layers, the upper layer was determined as comprising 11,529 grams, the lower layer comprised 1865 grams, and the mixture remaining in the base of the column weighed 623 grams. The total weight of the reactants of 14,040 grams (comprising 400 grams of methacrylic acid and 100 grams of $H_2SO_4$ in the column at the start of the reaction, plus 8500 grams of methacrylic acid and 5040 grams of ethanol added during the course of the reaction) should be compared with the total final weight of 14017 grams.

Analysis of (a) the upper layer, (b) the lower layer, and (c) the residue in the column showed: (a) for the upper layer: 11000 grams of ethyl methacrylate, 274 grams ethanol, 188 grams water; (b) for the lower layer: 9 grams ethyl methacrylate, 237 grams ethanol, 1619 grams water; (c) for the residue 203 grams ethyl methacrylate, 256 grams methacrylic acid, 13 grams water. A total of 11212 grams of ethyl methacrylate was formed from the 8500 grams of methacrylic acid introduced during the run and from 144 grams of methacrylic acid of the starting mixture giving 98.5 percent conversion.

Since the same column is used for the esterification of further quantities of methacrylic acid, the amount of ester present remaining in the column was considered to be part of the yield.

EXAMPLE 3

Preparation of methacrylic acid-n-butyl ester

A sump phase comprising 450 grams of a mixture of methacrylic acid and n-butanol (molar ratio 0.9:1.0) and 75 grams of concentrated sulfuric acid were put into an esterification reactor. At a reaction temperature of 98° C. and a pressure of 30 mm. Hg, a mixture of 184 grams of methacrylic acid and 176 grams of n-butanol were introduced per hour for 50 hours. The esterification distillate was withdrawn at a head temperature of 65° C./30 mm. Hg. Analysis of the distillate, specifically the upper and lower layers, showed that on the average, 300 grams of methacrylic acid butyl ester, 15 grams of n-butanol, and 38 grams of water were distilled over hourly. 95 percent of the total ester formed was found in the upper layer. The yield amounted to 98.5 percent of theory.

EXAMPLE 4

Preparation of methyl methacrylate

A sump phase comprising 400 grams of methacrylic acid and 200 grams of p-toluene sulfonic acid was introduced into an esterification reactor and heated to a temperature of 120° C. at a pressure of 250 mm. Hg. A mixture of 200 grams of methairylic acid and 78 grams of methanol was introduced per hour for a period of 30 hours. The mol ratio methanol:methacrylic acid was 1.0:0.95. The esterification distillate was drawn off continuously at a head temperature of 59° C./250 mm. Hg.

The distillate separated into an upper and a lower layer, the former being partly recycled into the reactor. The distillate collected in one hour comprised 230 grams of methyl methacrylate, 4 grams of methanol, and 41 grams of water. About 99 percent of the ester formed were found in the upper layer. The yield amounted to 99 percent of theory.

EXAMPLE 5

Preparation of ethyl methacrylate

In an esterification reactor charged with a mixture of 400 grams of methacrylic acid and 150 grams of benzene sulfonic acid a mixture of 300 grams of methacrylic acid and 175 grams of ethanol was introduced per hour at a reactor temperature of 125° C. and a pressure of 250 mm. Hg for a period of 24 hours. The mol ratio ethanol:methacrylic acid was 1.0:0.92.

The esterification distillate was drawn off continuously at a head temperature of 74° C./250 mm. Hg and yielded 388 grams of ethyl methacrylate, 13 grams of ethanol, and 60 grams of water. The distillate separated into two layers the upper one containing 99 percent of the ester formed. The yield amounted to 97.5 percent of theory.

What is claimed is:

1. In a process for the continuous preparation of a methacrylic acid ester by the reaction of methacrylic acid with a lower aliphatic alcohol at an elevated temperature in the presence of at least one catalyst selected from the group consisting of sulfuric acid and a sulfonic acid, the improvement which comprises introducing methacrylic acid and said alcohol in approximately an equimolar ratio, and at a temperature of 70° C. to 170° C., into a sump phase in the base of a fractionating column at at most the same velocity with whiih the desired methacrylic acid ester is formed, and removing said ester by distillation, said sump phase initially comprising (a) a methacrylic acid portion which is 50–200 percent by weight of the methacrylic acid to be introduced thereinto per hour, and (b) an amount of $SO_3$, introduced in the form of sulfuric acid or sulfonic acid, which is 8–30 percent by weight of the methacrylic acid present in the sump phase, said sulfonic acid having the formula $RSO_3H$ wherein R is —$C_6H_5$, —$C_6H_4CH_3$, or —$C_6H_4SO_3R'$, and wherein R' is —H, —$CH_3$, —$C_2H_5$, or —$C_3H_8$.

References Cited

UNITED STATES PATENTS 3,337,610  8/1967  Bellringer et al. _____ 260—486
3,354,199  11/1967  Lachowicz et al. _____ 260—486

LORRAINE A. WEINBERGER, Primary Examiner

P. J. KILLOS, Assistant Examiner